May 20, 1941. A. AMENABAR 2,242,217
PROCESS FOR THE LIXIVIATION OF COPPER ORES
AND THE SUBSEQUENT RECOVERY OF COPPER
Filed April 28, 1938
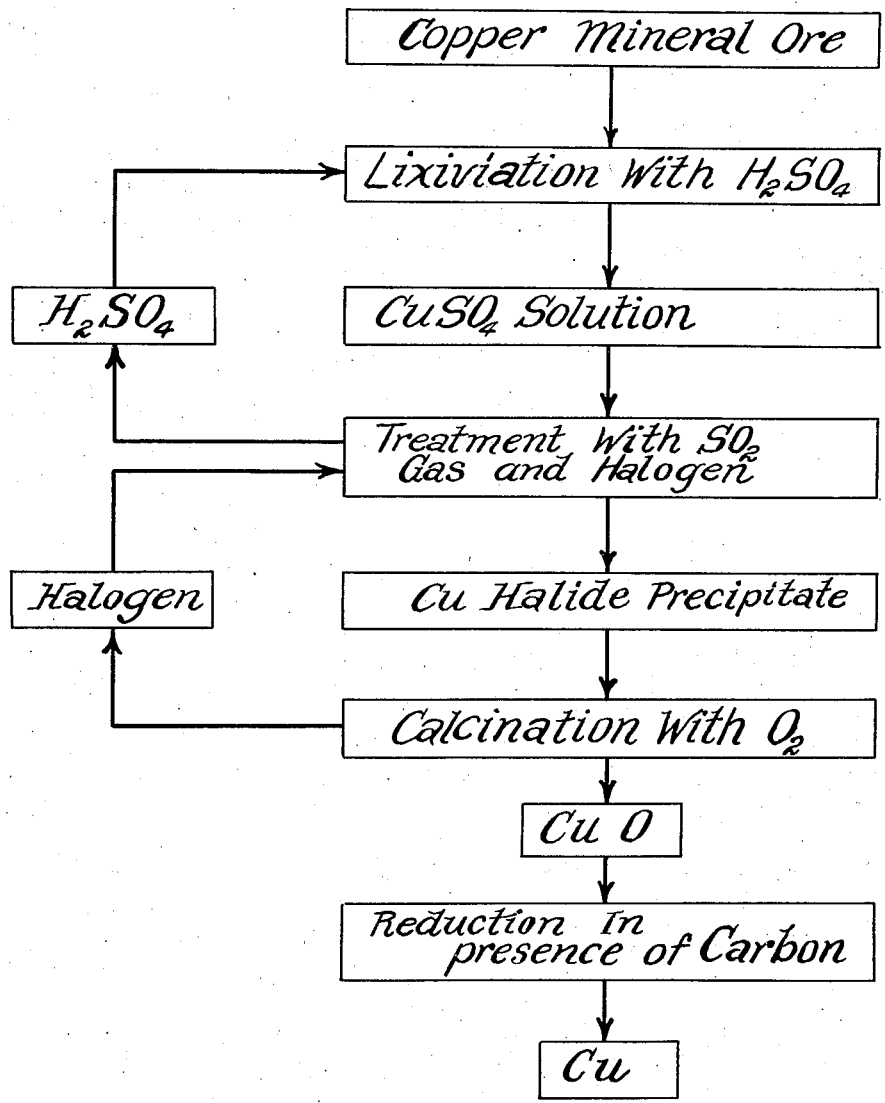
Inventor,
A. Amenabar Patented May 20, 1941

2,242,217

UNITED STATES PATENT OFFICE 2,242,217

PROCESS FOR THE LIXIVIATION OF COPPER ORES AND THE SUBSEQUENT RECOVERY OF COPPER

Arturo Amenabar, Santiago, Chile, assignor to Ovalle, Tupper & Amenabar Limitada, Santiago, Chile Application April 28, 1938, Serial No. 204,884

1 Claim. (Cl. 75—117)

The present invention relates to an industrial process for the lixiviation of copper ores and the subsequent recovery of copper. According to the present invention and constituting an essential feature thereof, the reagents which are necessary for treating the copper are regenerated and recycled through the process.

The present invention is a modification and improvement of the process disclosed in my U. S. Patent No. 1,343,153.

In the following description of the process wherever the term "iodine" or "iodide" is used it will be understood that bromine and chlorine or bromide and chloride, etc., may also be used.

The accompanying drawing is a diagrammatic representation in the form of a flowsheet of the cyclic embodiment of the process.

Referring now to the special manner of lixiviating the minerals of copper, which is an essential feature of my invention, I have discovered that if copper mineral ore, especially that of porphyritic composition is moistened with sulphuric, nitric and hydrochloric acid solutions, and is left without watering for 10 or 12 days, the water in the acid solution will have evaporated, and the sulphuric acid will have acted on the copper to form copper sulphate crystals within the rock, the crystals having a greater volume than the copper components of the ore so that the rock is broken along the fissures or veins of major mineralization.

Taking the above phenomenon as a basis, I have lixiviated the minerals in lumps without crushing, with good commercial results.

The uncrushed minerals may be placed in extensive fields, for example, in piles ten metres wide, 100 metres long, and 6 or 7 metres high on a slight incline in order that the lixiviation solutions may drain off into a collecting canal. These fields are covered with bituminous asphalt impervious to acids.

The lixiviating solution is applied to the ore in the form of a spray and in sections of say 10 metres at a time so that each section of the field gets sprayed every ten days. These intermittent sprayings permit the formation of crystals of copper sulphate within the mineral mass, which causes the disintegration of the mass without the necessity of using mechanical mills.

While the minerals are being treated in the above manner and when they contain copper sulfate, the spraying solutions should contain nitric sulphuric and hydrochloric acid and also some copper and from 1% to 2% ferrous or ferric sulphate. The existence of copper in these solutions does not affect them as the process is a closed cycle.

As soon as the spraying with these superoxidizing solutions begins, red nitrous vapors can be observed emanating from the piles of the mineral. At this moment the piles should be sprayed with a solution containing sulphuric acid and ferrous sulphate. The ferrous sulphate reacts with the nitrous vapors to form ferric sulphate, which serves to dissolve the calcosite and bornite of the minerals ($Cu_2S$ and $CuS$). The existence of sulphuric acid, air and copper sulphate causes a great amount of the nitrous gases to become nitric gases.

The copper bearing solutions of the lixiviating mixture are now treated with iodine in its elemental form or in the form of its acid HI together with sulphurous acid anhydride gases in order to precipitate copper.

The chemical reactions which take place are simultaneous; the hydro-iodic gas is produced in the presence of $SO_2$, the copper precipitates as copper iodide, while the $SO_2$ is turned into sulphuric acid at the same moment.

The chemical reactions which take place in this process can be expressed by the following equations:

$$2I+2SO_2+4H_2O+2CuSO_4=Cu_2I_2+4H_2SO_4$$

This new process of simultaneous operations has the advantage of making the sulphuric acid much more concentrated, since no reversible reaction exists between the sulphuric acid and the hydroiodic acid for as soon as the latter is formed, it is combined with the cupric solution in the presence of sulphurous acid anhydride, to produce cuprous iodide which is not affected by the concentrated and cold sulphuric acid, consequently, solutions of 15 to 20% sulphuric acid can easily be obtained.

In order to avoid the presence of iodine, in the solution of the resulting lixiviating acid, after precipitating the copper, I put less iodine in the reaction of precipitation than that which corresponds to the required theoretical amount so that the solution of lixiviating acid will contain from two to three tenths per cent of copper, because when there is copper in the solution it cannot in any case contain hydroiodic acid or iodine.

The lixiviating solution of sulphuric acid which results from this reaction is utilized in treating new masses of copper mineral ore as explained hereinbefore.

The total amount of iodine used in the precipitation of the copper, including that which is in solution, is in the proportion of two parts of iodine to one of copper in solution (127 of iodine to 63½ of copper), and in the case of bromine, 1.259 of bromine to each one of copper in solution (79.92 of bromine to 63½ of copper, according to their atomic weights).

The precipitated product, cuprous iodide, is put through a filter press or subjected to vacuum, for the purpose of extracting most of the water and afterwards it is heated to a temperature of 80° to 100° C., in order to dry it completely before treating it in a tubular silicon iron kiln in the presence of oxygen, where it is converted into cuprous oxide and then reduced by anthracite and wood into metallic copper in the form of powder.

The temperature inside the kiln should be lower than 650° C., the melting point of cuprous iodide for the fusion of the salt must be avoided because it makes the transformation into copper oxide difficult.

The basis of this step is the use of compressed air, oxygen and cupric oxide instead of ordinary atmospheric air, the cupric oxide being continuously regenerated by the use of compressed air.

The chemical reactions which take place are as follows:

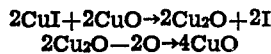

$$2CuI + 2CuO \rightarrow 2Cu_2O + 2I$$
$$2Cu_2O - 2O \rightarrow 4CuO$$

As these reactions are exothermic, once the solution is melted, very little heat will be required to keep it in liquid form, because the oxidation of copper by means of compressed air produces 42,000 calories.

The iodine vapors are condensed and converted into the acid or dissolved in solution by spraying them with a lixiviation solution charged with sulphurous acid anhydride or with fresh water saturated with sulphurous acid anhydride. The iodine is partly transformed into the acid and about 60% of the iodine is dissolved in solution. In order to regulate the quantity of hydroiodic acid produced by the spraying operation, the quantity of sulphurous acid anhydride should be regulated.

In order to prevent the loss of any of the iodine vapors or hydroiodic acid gas, which has not been dissolved by the lixiviating solution, the gases are sprayed with a solution of copper sulphate saturated with sulphurous acid anhydride which will react with the smallest trace of iodine or its acid gas to precipitate insoluble cuprous iodide.

Having now particularly described the method of carrying out the present invention, what I claim is:

A cyclic process for treating copper ore comprising lixiviating the ore with sulfuric acid, treating the resulting copper sulfate solution with sulfur dioxide and a halogen to precipitate copper halide, the resulting sulfuric acid being returned directly to the process for lixiviating the ore and calcining the copper halide with oxygen to form an oxide of copper, the freed halogen being returned directly to the copper sulfate solution to form the copper halide.

ARTURO AMENABAR.